United States Patent Office 3,272,790
Patented Sept. 13, 1966

3,272,790
POLYPEPTIDES
Luigi Bernardi, Milan, Germano Bosisio, Palazzolo Milanese, Milan, and Francesco Chillemi and Onofrio Goffredo, Milan, Italy, assignors to Società Farmaceutici Italia, Milan, Italy, a corporation of Italy
No Drawing. Filed Jan. 20, 1964, Ser. No. 338,574
Claims priority, application Italy, Jan. 25, 1963, 1,586/63
12 Claims. (Cl. 260—112.5)

Our invention relates to therapeutically useful polypeptides having the formula:

X-L-alanyl-L-phenylalanyl-L-isoleucyl-glycyl-L-leucyl-L-methionionamide wherein X represents an L-lysyl-L-aspartyl, L-seryl-L-lysyl-L-aspartyl or L-prolyl-L-seryl-L-lysyl-L-aspartyl radical, to the salts and protected derivatives thereof and to a process for their preparation.

More particularly, the object of our invention consists of: the octapeptide, L-lysyl-L-aspartyl-L-alanyl-L-phenyl-alanyl-L - isoleucyl - glycyl - L - leucyl-L-methioninamide; the nonapeptide, L-seryl-L-lysyl-L-aspartyl-L-alanyl-L-phenyl-alanyl-L - isoleucyl - glycyl-L-leucyl-L-methioninamide; the decapeptide, L-prolyl-L-seryl-L-lysyl-L-aspartyl-L-alanyl-L-phenylalanyl - L - isoleucyl-glycyl-L-leucyl-L-methioninamide, the salts and protected derivatives thereof having the amino and the carboxyl groups, not involved in the formation of the peptidic linkage, suitably blocked by a protecting group capable of being removed by hydrogenolysis or acidolysis. These new polypeptides have a high peripheral vasodilatory activity making useful their employment in the therapy of hypertension.

The process of the invention comprises condensing the hexapeptide L-alanyl-L-phenylalanyl-L-isoleucyl-glycyl-L-leucyl-L-methioninamide with a compound selected from the group consisting of the dipeptide, L-lysyl-L-aspartic acid, in which the two amino groups of the lysine and the β-carboxyl group of the aspartic acid are blocked by protecting groups capable of being removed by acidolysis or hydrogenolysis; the tripeptide, L-seryl-L-lysyl-L-aspartic acid, in which the amino group of the serine, the ε-amino group of the lysine and the β-carboxyl group of the aspartic acid are blocked by protecting groups capable of being removed by acidolysis or hydrogenolysis; and the tetrapeptide, L-prolyl-L-seryl-L-lysyl-L-aspartic acid, in which the imine group of the proline, the ε-amino group of the lysine and the β-carboxyl group of the aspartic acid are blocked by protecting groups capable of being removed by acidolysis or hydrogenolysis. The condensation is carried out in the presence of a carbonidiimide condensing agent to yield a protected polypeptide of the structure: X-L-alanyl-L-phenylalanyl-L-isoleucyl-glycyl-L-leucyl-L-methioninamide, wherein X represents a protected L-lysyl-L-aspartyl, L-seryl-L-lysyl-L-aspartyl, or L-prolyl-L-seryl-L-lysyl-L-aspartyl radical having the amino and carboxyl groups not involved in the formation of the peptidic linkage suitably blocked by a protecting group. The protecting groups are eliminated from the protected polypeptide, to give the corresponding polypeptide as a salt with an inorganic or organic acid, from which the free polypeptide may readily be obtained by conventional techniques.

Typical examples of the salts of the invention are: hydrochlorides, hydrobromides, sulfates, acetates, trifluoroacetates, gluconates, tartrates, maleates, maleinates, flumarates, citrates, methansulfonates, pamoates and other nontoxic, pharmaceutically acceptable salts.

Tosyl-(p.toluen-sulfonyl-), carbobenzoxy-(carbobenzyloxy), carbo-t.butoxy, trityl-(triphenylmethyl-), formyl-, trifluoroacetyl groups and others usually employed in polypeptide chemistry may be used to protect the amino groups.

Methyl-, ethyl-, t.butyl-, benzyl-, p.nitro-benzyl- groups and others usually employed may be used to protect the carboxyl groups.

The condensation between the free amino group of a polypeptide molecule and the carboxyl group of another polypeptide molecule may be accomplished through an acyl-derivative such as the azide or the p-nitro-phenylester, or preferably by direct condensation between the free amine and the free carboxyl group in the presence of a condensing agent, such as a carbodiimide, for example dicyclohexyl-carbodiimide, and 1-cyclohexyl-3-morpholinyl-carbodiimide. The condensation may be carried out in a solvent, for example N,N-dialkylformamides or lower aliphatic nitriles, such as dimethylformamide or acetonitrile. Reaction starts in the cold, between −50 and 0° C., and is completed at room temperature in from 5 to 50 hours.

From the protected polypeptide, on elimination of the protecting groups, there may be obtained the corresponding polypeptide free or salified with organic or inorganic acids according to the agent employed for removing the protecting groups. The choice of agent depends on the nature of the protecting group and may be metallic sodium in liquid ammonia, hydrogen in the presence of palladium catalyst, anhydrous hydrogen halides in glacial acetic acid, or trifluoroacetic acid. The free polypeptide may be obtained by displacement from the corresponding salts by a suitable base or by passing through ion exchange resins. The purification of the polypeptides of the invention may also be performed for example by chromatography over alumina, cellulose or an ion exchange resin or by countercurrent distribution.

The starting materials for the process of the invention are: the hexapeptide, L-alanyl-L-phenyl-alanyl-L-isoleucyl-glycyl-L-leucyl-L-methioninamide, which may be prepared as described in copending U.S. application Serial No. 227,564, filed October 1, 1962; the dipeptide, L-lysyl-L-aspartic acid; the tripeptide, L-seryl-L-lysyl-L-aspartic acid; and the tetrapeptide, L-propyl-L-seryl-L-lysyl-L-aspartic acid. The last three, which, as far as known, are new compounds, may preferably be prepared in the following manner:

The dipeptide, L-lysyl-L-aspartic acid, is prepared as follows: A mixed ester of L-aspartic acid, for example α-methyl and β-t.butyl-L-aspartate, is condensed with L-lysine, whose amino groups are blocked by a protecting group, for example a carbo-t.butoxy group. The condensation is carried out in the presence of a suitable condensing agent, such as dicyclo-hexylcarbodiimide, to yield the mixed ester of the dipeptide, L-lysyl-L-aspartic acid, for example bis-carbo-t.butoxy-L-lysyl-(α-methyl-β-t.butyl-)-L-aspartate, whose α-ester-grouping is then selectively saponified with an alkaline hydrolyzing agent, for example dilute sodium- or potassium hydroxide, whereby the dipeptide, L-lysyl-L-aspartic acid, is obtained, in which the two amino groups of the lysine and the β-carboxyl group of the aspartic acid are blocked by a protecting group. This protected dipeptide, L-lysyl-L-aspartic acid, is condensed with the hexapeptide, L-alanyl-L-phenyl-alanyl - L - isoleucyl-glycyl-L-leucyl-L-methioninamide, in the presence of a suitable condensing agent, such as dicyclohexyl-carbodiimide, to yield the corresponding octapeptide, L-lysyl-L-aspartyl-L-alanyl-L-phenyl - alanyl - L-isoleucyl-glycyl-L-leucyl-L-methioninamide, in which the two amino groups of the lysine and the β-carboxyl group of the aspartic acid are blocked by protecting groups. By elimination of the protecting groups with the reagents usually employed for this purpose, preferably trifluoroacetic acid, the non-protected octapeptide is obtained in the form of a salt, from which the free octapeptide may be prepared.

The tripeptide, L-seryl-L-lysyl-L-aspartic acid, is prepared as follows: A mixed ester of L-aspartic acid, for example (α-methyl-β-t.butyl-)-L-aspartate, is condensed with a protected derivative of L-lysine, in which the two amino groups are blocked by different protecting groups, for example α-N-carbo-benzoxy-ε-N-carbo-t-butoxy-L-lysine. This condensation is carried out in the presence of a suitable condensing agent, such as dicyclohexyl-carbodiimide, to yield the mixed ester of the dipeptide, L-lysyl-L-aspartic acid, in which the two amino groups of the lysine are blocked by different protecting groups: α - N - carbobenzoxy - ε - N - carbo - t - butoxy - L - lysyl-(α-methyl-β-t-butyl)-L-aspartate, in which the protecting group on the α-amino group of the lysine is then removed by catalytic hydrogenolysis to yield ε-N-carbo-t-butoxy-L-lysyl-(α-methyl-β-t-butyl)-L-aspartate. A derivative of L-serinazide, such as N-carbo-t-butoxy-L-serinazide, prepared from the corresponding hydrazide, is reacted with the mixed ester of the dipeptide, L-lysyl-L-aspartic acid, just described, in which the α-amino group of the lysine is free, to yield a protected tripeptide, L-seryl-L-lysyl-L-aspartic acid, for example N-carbo-t-butoxy-L-seryl-ε-N-carbo - t - butoxy - L - lysyl - (α - methyl - β - t - butyl)-L-aspartate. The α-ester group is then selectively saponified with an alkaline hydrolyzing agent, for example dilute sodium or potassium hydroxide, yielding thereby the tripeptide, L-seryl-L-lysyl-L-aspartic acid, in which all the amino groups not involved in the peptidic linkage and the β-carboxyl group of the aspartic radical are blocked by protecting groups, while the α-carboxyl group is free. This protected tripeptide, L-seryl-L-lysyl-L-aspartic acid, is condensed with the hexapeptide, L-alanyl-L-phenylalanyl - L - isoleucyl - glycyl - L - leucyl - L - methioninamide, in the presence of a suitable condensing agent, such as dicyclohexyl-carbodiimide, to yield the corresponding protected nonapeptide, L-seryl-L-lysyl-L-aspartyl - L - alanyl - L - phenylalanyl - L - isoleucyl - glycyl-L-leucyl-L-methioninamide, in which the amino group of serine, the ε-amino group of lysine and the β-carboxyl group of the aspartic radical are blocked by protecting groups. By elimination of the protecting groups with trifluoroacetic acid, the non-protected nonapeptide in the form of a salt is obtained, from which the free nonapeptide may be obtained.

The tetrapeptide, L-prolyl-L-seryl-L-lysyl-L-aspartic acid, is prepared as follows: A mixed ester of the dipeptide, L-lysyl-L-aspartic acid having the amino and carboxyl groups not involved in the peptidic linkage protected, with the exception of the α-amino group of the lysine, for example ε-N-carbo-t-butoxy-L-lysyl-(α-methyl-β-t-butyl)-L-aspartate, is condensed with a protective derivative of serine, for example N-carbo-benzoxy-L-serine. The condensation is carried out in the presence of a suitable condensing agent, such as dicyclohexyl-carbodiimide, to yield a mixed ester of the tripeptide, L-seryl-L-lysyl-L-aspartic acid, in which the amino group of the serine and the ε-amino group of lysine are blocked by different protecting groups, such as N-carbobenzoxy-L-seryl-ε-N-carbo - t - butoxy - L - lysyl - (α - methyl - β - t - butyl)-L-asparate. The protecting group on the amino group of the serine is removed by catalytic hydrogenation to yield intermediate L - seryl - ε - N - carbo - t - butoxy-L - lysyl - (α - methyl - β - t - butyl) - L - aspartate. A protected derivative of L-proline, for example N-carbo-t-butoxy-L-proline, is condensed with the intermediate L - seryl - ε - N - carbo - t - butoxy - L - lysyl - (α-methyl-β-t-butyl)-L-aspartate in the presence of a suitable condensing agent, such as dicyclohexyl-carbodiimide, to yield a mixed ester of the protected tetrapeptide acid, L-prolyl-L-seryl-L-lysyl-L-aspartic acid for example N-carbo - t - butoxy - L - prolyl - L - seryl - ε - N - carbo-t - butoxy - L - lysyl - (α - methyl - β - t - butyl) - L-aspartate, in which the protecting group on the α-carboxyl group of the aspartic radical is then selectively saponified with an alkaline hydrolyzing agent, for example dilute sodium or potassium hydroxide yielding thereby the tetrapeptide, L - prolyl - L - seryl - L - lysyl-L-aspartic acid, in which all the amino groups not involved in the peptidic linkage and the β-carboxyl group of the aspartic radical are blocked by protecting the groups, while the α-carboxyl group is free. The protected tetrapeptide, L - prolyl - L - seryl - L - lysyl - L-aspartic acid, is condensed with the hexapeptide, L-alanyl - L - phenyl - alanyl - L - isoleucyl - glycyl - L-leucyl - L - methioninamide, in the presence of a suitable condensing agent, such as dicyclohexyl-carbodiimide, to yield the corresponding protected decapeptide L-prolyl-L - seryl - L -lysyl - L - aspartyl - L - alanyl - L - phenylalanyl - L - isoleucyl - glycyl - L - leucyl - L - methioninamide, in which the imine group of the proline, the ε-amino group of the lysine and the β-carboxyl group of the aspartic radical are blocked by protecting groups. By the elimination of the protecting groups with trifluoroacetic acid, the nonprotected decapeptide is obtained in the form of a salt from which the free decapeptide may be obtained.

The compounds of the invention are useful in clinical employment for hypertensive attacks or in emergency therapy of serious hypertension, in vascular spastic syndromes, especially in muscle-cutaneous sections (Burger's Disease, Raynaud's Disease, thromboangioitis obliterans, or torpid ulcers) of the retinal vessels (amaurosis from spasm of the retina central action), of meningeal vessels (cephalea and hemicrania from vasospasm) and of the coronary vessels (angina attacks). The compounds of the invention may be administered by parenteral route; subcutaneously, intramuscularly, intravenously (a single injection or slow dripping) or intraarterially. The most suitable solvents are water or physiological saline, but not alkaline solutions. By the subcutaneous or intramuscular route they can be mixed with substances to retard their absorption. The percentage of active ingredient may vary according to the particlar pharmaceutical form and the hypotensive effect desired, but generally it is very low. Acute or chronic toxicity manifestations have not been noticed in the use of the polypeptides of the invention.

The following examples are to illustrate, but not to limit, the invention.

*Example 1.—α-ε-N-dicarbo-t-butoxy-L-lysyl-(β-t-butyl)-L-aspartate*

30 g. of N - carbobenzoxy - (β - t - butyl) - L - aspartate dicyclohexylammonium salt (prepared as in Helv. Chim. Acta 1961, 44, 2003) were suspended in 200 cc. of water and the suspension was acidified with 65 cc. of 1 N phosphorous acid. The mixture was extracted with ethyl acetate. The extracts collected were dried over anhydrous sodium sulfate and evaporated in vacuo to dryness. The oily residue was dissolved in 80 cc. of methylene dichloride and the solution was treated with diazomethane (in methylene dichloride) up to a persistent yellow coloring. The slight excess of diazomethane was decomposed with acetic acid. The mixture was washed with 1M sodium bicarbonate solution. The organic phase was dried over anhydrous sodium sulfate and the solvent evaporated in vacuo. To the oily residue, dissolved in 100 cc. of ethanol, 4 g. of 10% palladium on charcoal were added and the mixture was hydrogenated for 5 hours at atmospheric pressure. After filtering off the catalyst, the solvent was evaporated in vacuo and the residue dissolved in 20 cc. of anhydrous ether. To the ether solution, cooled to −10° C., 30 cc. of a 2 N hydrochloric acid solution in absolute methanol were added. The precipitate was filtered, washed with anhydrous ether and dried in vacuo over potassium hydroxide. 10 g. of α - methyl - β - t - butyl - L - aspartate - hydrochloride, melting at 170–175° C., $[\alpha]_D^{25} = +22°$ (c.=2 in methanol) were obtained. The chromatographic analysis on Whatman paper 4 and with the solvent system n-butanol/acetic acid/water showed a $Rf=0.88$.

This product was condensed with α-ε-N-dicarbo-t-butoxy-L-lysine which was prepared as follows: to a solution containing 20 g. of sodium hydroxide in 240 cc. of water, 18.26 g. (0.1 mol) of L-lysine monohydrochloride and 360 cc. of ter-butanol were added. With fast stirring 71.8 g. (0.3 mol) of p.nitrophenyl-t-butyl-carbonate were added and the whole was refluxed for 30 minutes. The orange-colored solution obtained was concentrated to a small volume, taken up with a small amount of water, and the resulting sodium p.nitrophenate was left to crystallize for 2 hours in a refrigerator. The solution was filtered and washed with about 50 cc. of icy water. The filtrate, cooled to 0° C., was acidified with concentrated hydrochloric acid up to pH 5.3 and extracted twice with ether to remove the p.nitrophenol. The solution was acidified up to pH=1 and extracted three times with ether. The ether extract, washed with a small amount of icy water, was dried over anhydrous sodium sulfate and evaporated in vacuo to obtain 19.7 g. of a thick oily residue of a slightly yellowish color. The product was purified over its dicyclohexylammonium salt which, recrystallized from ether, melts at 141–142° C. To a suspension of 3.840 g. of α-methyl-β-t-butyl-L-aspartate-hydrochloride in 120 cc. of methylene dichloride, 1.620 g. of triethylamine were added. To the clear solution thus obtained, 5.540 g. of α-ε-N-dicarbo-t-butoxy-L-lysine were added with rapid stirring. The stirring was carried on up to complete dissolution. The solution was cooled on an ice-bath to 0° C. and 3.310 g. of dicyclohexylcarbodiimide were added. After 5 hours, the ice-bath was removed and the solution was kept stirred overnight at room temperature. When the separation of dicyclohexylurea (3.150 g.) was over, the solution was filtered and the residue washed with methylene dichloride. The filtrate diluted with methylene chloride and cooled to −10° C., was washed with 1 N hydrochloric acid saturated with sodium chloride cooled to −10° C., with saturated sodium chloride solution, and with saturated sodium bicarbonate solution in sequence. The resulting solution, in methylene dichloride, was dried over anhydrous sodium sulfate and evaporated in vacuo to dryness. 8.6 g. of a colorless, oily, liquid residue remained consisting of α-ε-N-dicarbo-t-butoxy-L-lysyl-(α-methyl-β-t-butyl)-L-aspartate, which was submitted to selective saponification: To a solution of 2.130 g. of α-ε-N-dicarbo-t-butoxy-L-lysyl-(α-methyl-β-butyl)-L-aspartate in 50 cc. of 80% aqueous ethanol, 4 cc. of 1 N sodium hydroxide were added and the whole was stirred at 20° C. for 15 minutes, whereupon 2 cc. of 5% aqueous sodium bicarbonate solution were added. The solution was diluted with 110 cc. of water and two ether extractions were carried out in order to remove all possible impurities. The aqueous solution cooled to −10°C. was acidified with 6 cc. of 1 N hydrochloric acid and extracted three times with ethyl acetate. The combined organic extracts were washed twice with water, dried over anhydrous sodium sulfate and evaporated in vacuo to dryness. 1.630 g. of an amorphous white product consisting of α-ε-N-dicarbo-t-butoxy-L-lysyl-(β-t-butyl)-L-aspartate were obtained.

In order to determine its chromatographic and electrophoretic properties, this product was treated with trifluoroacetic acid to remove the protecting groups. The free polypeptide thus obtained presents in chromatography on Whatman paper 4 and with the n-butanol/acetic acid/water 4:1:1 solvent system $Rf=0.045$. The electrophoretic migration coefficients are $E_{1.9}=0.90$ His; $E_{1.9}=1.45$ Leu.

*Example 2.—α-ε-N-dicarbo-t-butoxy-L-lysyl-(β-t-butyl)-aspartyl - L - alanyl - L - phenylalanyl - L - isoleucyl-glycyl-L-leucyl-L-methioninamide*

To a solution of 2.08 g. of L-alanyl-L-phenylalanyl-L-isoleucyl-glycyl-L-methioninamide cooled to 0° C. and 1.820 g. of α-ε-N-dicarbo-t-butoxy-L-lysyl-(β-t-butyl)-L-aspartate in 40 cc. of dimethylformamide, 0.790 g. of dicyclohexyl-carbodiimide were added, the whole was kept stirred in an ice-bath for 10 hours and then overnight at room temperature. The dicyclohexylurea thus separated (0.500 g.) was filtered and washed with 10–15 cc. of dimethylformamide. The yellowish filtrate was evaporated in vacuo to dryness. The gelatinous residue was submitted to purification by countercurrent distribution: 600 transfers were carried out in the carbon tetrachloride/chloroform/methanol/water 3:7:8:3 system. The contents of tubes 28–42 were evaporated to dryness to yield 2 g. of product melting at 220–222° C. (decomposition).

*Example 3.—L-lysyl-L-aspartyl-L-alanyl-L-phenylalanyl-L-isoleucyl-glycyl-L-leucyl-L-methioninamide*

1.150 g. of α-ε-N-dicarbo-t-butoxy-L-lysyl-β-t-butyl-L-aspartyl-L-alanyl - L - phenylalanyl-L-isoleucyl-glycyl-L-leucyl-L-methioninamide were dissolved in 150 cc. trifluoroacetic acid at room temperature and the whole was allowed to react 2 hours and stirred from time to time. The trifluoroacetic acid was distilled off in vacuo and the residue, triturated with ether, solidified. The solid was filtered, washed with ether, dissolved in dimethylformamide, and precipitated with ethyl acetate. The precipitate was filtered, washed with ethyl acetate and dried. 0.900 g. of a product melting at 214–216° C. (decomposition) was obtained showing the following chromatographic and electrophoretic properties: $Rf=0.56$ (n-butanol/acetic acid/water 4:1:1). $E_{1.9}=0.46$ His; $E_{1.9}=0.72$ Leu.

The bistrifluoroacetate of the octapeptide may be converted into the corresponding free polypeptide by passing it through an ion exchange resin, for example the ion retardation resin supplied by Bio-Rad Laboratories Richmond-California U.S.A. under the code AG 11A8.

The free polypeptide thus obtained may be converted into salts with inorganic acids to yield salts such as the hydrochloride, hydrobromide, sulfate, tartrate, maleate and fumarate.

*Example 4.—N-carbo-t-butoxy-L-seryl-ε-N-carbo-t-butoxy-L-lysyl-(β-t-butyl)-L-aspartate*

To a solution of 7.2 g. of α-methyl-β-t-butyl-L-aspartate hydrochloride in 150 cc. of methylene dichloride and 4.2 cc. of triethylamine, 11.4 g. of α-N-carbobenzoxy-ε-N-carbo-t-butoxy-L-lysine (prepared as in Helv. Chim. Acta, 1961, 44, 164) and, after cooling to 0° C., 6.6 g. of dicyclohexyl-carbodiimide were added. The mixture was kept overnight at 0° C. It was then filtered and washed with water. After drying over anhydrous sodium sulfate, the solution was evaporated in vacuo to dryness and the residue was recrystallized from ethyl acetate-petroleum ether. 12.5 g. (74%) of α-N-carbobenzoxy-ε-N-carbo-t-butoxy-L-lysyl-(α-methyl-β-t-butyl)-L-aspartate melting at 54–55° C. were obtained. $[\alpha]_D^{21}=-9°$ (c.=2 in ethanol). This product was submitted to catalytic hydrogenation as follows: To a solution of 5.6 g. of the α-N-carbobenzoxy-ε-N-carbo-t-butoxy-L-lysyl - (α-methyl-β-t-butyl)-L-aspartate dissolved in 60 cc. of ethanol, 2.5 g. of 10% palladium on charcoal were added. The mixture was hydrogenated at atmospheric pressure for 6 hours. The catalyst was filtered and the filtrate was evaporated in vacuo to dryness. A yield of 4.3 g. of syrupy residue consisting of ε-N-carbo-t-butoxy-L-lysyl-(α-methyl-β-t-butyl)-L-aspartate was obtained. Chromatographic analysis of Whatman paper 4 with an n-butanol/acetic acid/water 4:1:5 solvent system has $Rf=0.88$.

To a solution in ethyl acetate of N-carbo-t-butoxy-L-serinazide prepared from 2.2 g. of N-carbo-t-butoxy-L-serin-hydrazide (prepared as in Helv. Chim. Acta 1961, 44, 171), 4.3 g. of this ε-N-carbo-t-butoxy-L-lysyl-(α-methyl-β-t-butyl)-L-aspartate in 10 cc. of tetrahydrofuran were added. The mixture was allowed to react for 48 hours at +5° C. The solvent was evaporated in vacuo and the residue dissolved in ethyl acetate. The solution was washed with 1 N hydrochloric acid (at 0° C.), with 1M sodium bicarbonate and finally with water. The solution, dried over anhydrous sodium sulfate, was evaporated in vacuo to dryness, leaving 5 g. of syrupy residue consisting of N-carbo-t-butoxy-L-seryl-ε-N-carbo-t-butoxy-L-lysyl-(α-methyl-β-butyl)-L-aspartate, which was submitted to selective saponification as follows: To a solution of 2.8 g. of N-carbo-t-butoxy-L-seryl-ε-N-carbo-t-butoxy-L-lysyl-(α-methyl-β-t-butyl)-L-aspartate dissolved in 10 cc. of ethanol, 5.4 cc. of 1 N sodium hydroxide solution were added. After 15 minutes at room temperature, 80 cc. of water were added and the solution was cooled to 0° C., acidified with 5.5 cc. of 1 N hydrochloric acid and extracted with ethyl acetate. The collected extracts were washed, dried over anhydrous sodium sulfate and evaporated to dryness. 2 g. of N-carbo-t-butoxy-L-seryl-ε-N-carbo-t-butoxy-L-lysyl-(β-t-butyl)-L-aspartate were obtained as a foam.

*Example 5. — N-carbo-t-butoxy-L-seryl-ε-N-carbo-t-butoxy-L-lysyl-β-t-butyl-L-aspartyl-L-alanyl-L-phenylalanyl-L-isoleucyl-glycyl-L-leucyl-L-methioninamide*

To a solution of 1.7 g. of N-carbo-t-butoxy-seryl-ε-N-carbo-t-butoxy-L-lysyl-(β-t-butyl)-L-aspartate and 1.8 g. of L-alanyl-L-phenylalanyl-L-isoleucyl-glycyl-L-leucyl-L-methioninamide in 20 cc. of dimethylformamide, 0.7 g. of dicyclo-hexyl-carbodiimide were added with cooling to 0° C. The solution was allowed to react for 5 hours at 0° C. and for 24 hours at room temperature. The reaction mixture was filtered, the solvent evaporated in vacuo and the residue triturated with ether. Yield 2.5 g. of crude product.

*Example 6. — L-seryl-L-lysyl-L-aspartyl-L-alanyl-L-phenylalanyl-L-isoleucyl-glycyl-L-leucyl-L-methioninamide-bis-trifluoroacetate*

2.5 g. of N-carbo-t-butoxy-L-seryl-ε-N-carbo-t-butoxyl-L-lysyl - (β-t-butyl) - L-aspartyl-L-alanyl-L-phenylalanyl-L-isoleucyl-glycyl-L-leucyl-L-methioninamide were treated with 65 cc. of trifluoroacetic acid for one hour at room temperature. The trifluoroacetic acid was evaporated in vacuo and the residue washed with anhydrous ether. The product was purified by countercurrent distribution: 200 transfers were carried out in an n-butanol/0.5 N acetic acid system. The contents of tubes 70–95 were evaporated in vacuo to yield 0.7 g. of pure nonapeptide, melting at 245° C. (decomposition); $[\alpha]_D^{21}=-15°$ (c.=2 in dimethylformamide). Chromatographic and electrophoretic analysis showed the following results: $Rf=0.68$; $E_{1.9}=0.70$ Leu; $E_{1.9}=0.45$ His.

The bis trifluoroacetate of the nonapeptide may be converted into the corresponding free polypeptide by passage through an ion exchange resin. The free polypeptide thus obtained may be converted into salts with inorganic or organic acids to obtain salts such as the hydrochloride, hydrobromide, sulfate, tartrate, maleate, and fumarate.

*Example 7.—N-carbo-t-butoxy-L-propyl-L-seryl-ε-N-carbo-t-butoxy-L-lysyl-(β-t-butyl)-L-aspartate*

To an ice-cooled solution of 3.9 g. of N-carbo-benzoxy-L-serine (prepared as in Helv. Chim. Acta 1958, 41, 1858) and 7 g. of ε-N-carbo-t-butoxy-L-lysyl-(α-methyl-β-t-butyl)-L-aspartate in 150 cc. of methylene dichloride, 3.8 g. of dicyclohexylcarbodiimide were added. After one night at room temperature, the dicyclohexylurea was filtered off and the filtrate washed with 1 N hydrochloric acid (at 0° C.), with 1 M sodium bicarbonate solution, and with water. The residue was dried over anhydrous sodium sulfate and the solvent was evaporated in vacuo. The residue was recrystallized from ethyl-acetate petroleum ether. 7.9 g. (75%) of N-carbo-benzoxy-L-seryl-ε-N-carbo-t-butoxy-L-lysyl-(α-methyl-β-t-butyl)-L-aspartate melting at 102–104° C. were obtained. $[\alpha]_D^{24}=-18°$ (c.=2 in ethanol). This product was then submitted to catalytic hydrogenation as follows: To a solution of 6.5 g. of N-carbo-benzoxy - L-seryl-ε-N-carbo-t-butoxy-L-lysyl-(α-methyl-β-t-butyl)-L-aspartate in 80 cc. of ethanol, 3 g. of 10% palladium on charcoal were added and the mixture was kept under hydrogen at room temperature and atmospheric pressure for 6 hours. The catalyst was filtered and the filtrate evaporated in vacuo to dryness to yield 5.8 g. of a syrupy residue consisting of L-seryl-ε-N-carbo-t-butoxy-L-lysyl-(α-methyl-β-t-butyl)-L-aspartate. The chromatographic analysis preformed as usual determined a $Rf=0.82$.

This product was then condensed with N-carbo-t-butoxy-L-proline (prepared as in J. Amer. Chem. Soc. 1957, 79, 6180). A solution of 2.1 g. of N-carbo-t-butoxy-L-proline and 5.2 g. of L-seryl-ε-N-carbo-t-butoxy-L-lysyl-(α-methyl-β-t-butyl)-L-aspartate in 70 cc. of methylene dichloride was cooled to 0° C. and 2.1 g. of dicyclohexylcarbodiimide were added. The mixture was kept overnight at 0° C. and then filtered and washed with 1 N hydrochloric acid (at 0° C.), with 1 M sodium bicarbonate and finally with water. It was dried over anhydrous sodium sulfate and the solvent was evaporated in vacuo. The residue was recrystallized from ethyl acetate-petroleum ether. 4.6 g. (65%) of N-carbo-t-butoxy-L-prolyl-L-seryl-ε-N-carbo-t-butoxy-L-lysyl - (α-methyl-β-t-butyl)-L-aspartate melting at 103–107° C. were obtained; $[\alpha]_D^{22}=-42°$ (c.=2 in ethanol).

This product was then submitted to selective saponification as follows: To a solution of 2.5 g. of N-carbo-t-butoxy - L - prolyl - L - seryl - ε - N - carbo-t-butoxy-L-lysyl - (α - methyl - β - t - butyl)-L-aspartate in 10 cc. of ethanol, 4.2 cc. of 1 N sodium hydroxide were added. The reaction mixture was kept for 15 minutes at room temperature, then 25 cc. of water were added and the mixture was cooled at 0° C. and acidified by adding 4.4 cc. of 1 N hydrochloric acid. The resulting mixture was thoroughly extracted with ethyl acetate and the combined extracts were dried over anhydrous sodium sulfate and evaporated in vacuo to dryness. 2.1 g. of N-carbo-t-butoxy-L-prolyl-L-seryl-ε-N-carbo-t-butoxy-L-lysyl - (β-t-butyl)-L-aspartate, melting at 110° C. were obtained: $[\alpha]_D^{21}=-36°$ (c.=1.4 in ethanol).

*Example 8.—N-carbo-t-butoxy-L - prolyl-β-seryl-ε-N-carbo-t-butoxy-L - lysyl-β-t-butyl-L - aspartyl-L-alanyl-L-phenylalanyl-L-isoleucyl-glycyl-L - leucyl - L - methioninamide*

To a solution of 2 g. of N-carbo-t-butoxy-L-prolyl-L-seryl-ε-N-carbo-t-butoxy-L-lysyl - (β-t-butyl)-L-aspartate and 1.8 g. of L-alanyl-L-phenylalanyl-L-isoleucyl-glycyl-L-leucyl-L-methioninamide in dimethylformamide cooled to 0° C., 0.7 g. of dicyclohexyl-carbodiimide were added. The mixture was kept at 0° C. for 5 hours and then at room temperature for 24 hours. The dicyclohexylurea was separated by centrifuging and the limpid solution was evaporated in vacuo. The residue was washed with anhydrous ether and filtered. The product was purified by countercurrent distribution: 185 transfers were carried out in a methanol/water/carbon tetrachloride/chloroform (8:3:3:7) system. The contents of tubes 5 to 25 were evaporated to dryness to yield 1.6 g. of product melting at about 230° C.

*Example 9.—L-prolyl-L-seryl-L-lysyl-L-aspartyl-L-alanyl-L-phenylalanyl-L-isoleucyl-glycyl-L - leucyl-L-methioninamide-bis-trifluoroacetate*

2.5 g. of the protected decapeptide were treated with 100 cc. of trifluoroacetic acid for an hour at room temperature. Then trifluoroacetic acid was evaporated off in vacuo, the residue washed with anhydrous ether and filtered. The product was purified by countercurrent distribution: 200 transfers were carried out in an n-butanol/acetic acid/water (4:1:5) system; the contents of tubes 85 to 120 were evaporated to dryness to yield 1.3 g. of L-prolyl-L-seryl-L-lysyl-L-aspartyl-L-alanyl-L-phenylalanyl-L-isoleucyl-glycyl-L - leucyl-L - methioninamide-bis-trifluoroacetate, melting at about 250° C. (decomposition); $[\alpha]_D^{21} = -18°$, (c.=2 in dimethylformamide). Chromatographic analysis on Whatman paper 4 and with an n-butanol/acetic acid/water 4:1:5 solvent system showed $Rf=0.6$. Electrophoretic analysis gave the following results: $E_{1.9}=0.65$ Leu; $E_{1.9}=0.42$ His.

The trifluoroacetate of the decapeptide may be converted into the corresponding free polypeptide by passing it through an ion exchange resin.

The free polypeptide may be converted into salts with inorganic or organic acids to yield the hydrochloride, hydrobromide, sulfate, tartrate, maleate, and fumarate.

We claim:
1. A process for the preparation of polypeptides, the salts and protected derivatives thereof having the formula:

X-L-alanyl-L-phenylalanyl-L-isoleucyl-glycyl-L-leucyl-L-methioninamide wherein X is selected from the group consisting of L-lysyl-L-aspartyl, L-seryl-L-lysyl-L-aspartyl, and L-prolyl-L-seryl-L-lysyl-L-aspartyl, having the amino and carboxyl groups not involved in the formation of the peptidic linkage duly blocked by protecting groups, which comprises condensing the hexapeptide, L-alanyl-L-phenylalanyl-L-isoleucyl-glycyl-L-leucyl-L-methioninamide, with a peptide selected from the group consisting of L-lysyl-L-aspartic acid, L-seryl-L-lysyl-L-aspartic acid, and L-prolyl-L-seryl-L-lysyl-L-aspartic acid, having amino and carboxyl groups not involved in the formation of the peptidic linkage blocked by protecting groups capable of being removed by acidolysis, in a lower aliphatic nitrile solvent and a carbodiimide condensing agent.

2. A process for the preparation of polypeptides, the derivatives and salts thereof, having the formula:

X-L-alanyl-L-phenylalanyl-L-isoleucyl-glycyl-L-leucyl-L-methioninamide wherein X represents a protected radical selected from group consisting of L-lysyl-L-aspartyl-, L-seryl-L-lysyl-L-aspartyl- and L-prolyl-L-seryl-L-lysyl-L-aspartyl, said radical having the amino and carboxyl groups not involved in the formation of the peptidic linkage duly blocked by protecting groups, which comprises condensing the hexapeptide, L - alanyl - L-phenylalanyl-L-isoleucyl-glycyl-L-leucyl-L-methioninamide, with a peptide selected from the group consisting of L-lysyl-L-aspartic acid, L-seryl-L-lysyl-L-aspartic acid, and L-prolyl-L-seryl-L-lysyl-L-aspartic acid having amino and carboxyl groups not involved in the formation of the peptidic linkage duly blocked by suitable protecting groups able of being removed by hydrogenation, in a solvent selected from the group of N,N-dialkylformamides and lower aliphatic nitriles in the further presence of a condensing agent of the group of the carbodiimides, at a temperature between $=5°$ and 20° C. over a period of time between 5 and 50 hours to yield a protected polypeptide compound of the formula:

X-L-alanyl-L-phenylalanyl-L-isoleucyl-glycyl-L-leucyl-L-methioninamide wherein X has the above-mentioned significance.

3. A polypeptide of the formula:

X-L-alanyl-L-phenylalanyl-L-isoleucyl-glycyl-L-leucyl-L-methioninamide wherein X represents L-lysyl-L-aspartyl, L-seryl-L-lysyl-L-aspartyl, or L-prolyl-L-seryl-L-lysyl-L-aspartyl, the salts and protected derivatives thereof having the amino and carboxyl groups not involved in the formation of the peptidic linkage duly blocked by protecting groups capable of being removed.

4. α,ε-N-dicarbo-t-butoxy-L-lysyl-β-t-butyl-L - aspartyl-L-alanyl-L-phenylalanyl-L-isoleucyl-glycyl - L - leucyl - L-methioninamide.

5. A polypeptide selected from the group consisting of L-lysyl-L-aspartyl-L-alanyl-L-phenylalanyl - L - isoleucyl-glycyl-L-leucyl-L-methioninamide and the salts thereof.

6. L-lysyl-L-aspartyl-L-alanyl-L-phenylalanyl - L - isoleucyl-glycyl-L-leucyl-L-methioninamide-bis - trifluoroacetate.

7. N-carbo-t-butoxy-L-seryl-ε-N-carbo-t-butoxy-L-lysyl-(β-t-butyl)-L-aspartyl-L-alanyl-L-phenylalanyl - L - isoleucyl-glycyl-L-leucyl-L-methioninamide.

8. A polypeptide selected from the group consisting of L-seryl-L-lysyl-L-aspartyl-L-alanyl-L-phenylalanyl - L - isoleucyl-glycyl-L-leucyl-L-methioninamide and the salts thereof.

9. L-seryl-L-lysyl-L-aspartyl-L-alanyl-L-phenyl - alanyl-L-isoleucyl-glycyl-L-leucyl-L-methioninamide - bis - trifluoroacetate.

10. N-carbo-t-butoxy-L-prolyl-L-seryl-ε-N - carbo - t-butoxy-L-lysyl-(β-t-butyl)-L-aspartyl-L-alanyl-L - phenylalanyl-L-isoleucyl-glycyl-L-leucyl-L-methioninamide.

11. A polypeptide selected from the group consisting of L-prolyl-L-seryl-L-lysyl-L-aspartyl-L-alanyl - L - phenylalanyl-L-isoleucyl-glycyl-L-leucyl-L - methioninamide and the salts thereof.

12. L-prolyl-L-seryl-L-lysyl-L-aspartyl-L - alanyl - L-phenylalanyl-L-isoleucyl-glycyl-L-leucyl - L - methioninamide-bis-trifluoroacetate.

References Cited by the Examiner

UNITED STATES PATENTS 3,014,023    12/1961    Schwyzer et al. ____ 260—112.5

FOREIGN PATENTS 1,130,817    6/1962    Germany.

LEWIS GOTTS, Primary Examiner.

P. A. STITH, Assistant Examiner.